US011531847B2

(12) United States Patent
Wang et al.

(10) Patent No.: US 11,531,847 B2
(45) Date of Patent: Dec. 20, 2022

(54) DATA LABELING METHOD, APPARATUS AND SYSTEM

(71) Applicant: BEIJING BAIDU NETCOM SCIENCE AND TECHNOLOGY CO., LTD., Beijing (CN)

(72) Inventors: Guanchao Wang, Beijing (CN); Yuqian Jiang, Beijing (CN); Shuhao Zhang, Beijing (CN); Tao Jiang, Beijing (CN); Siqi Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 257 days.

(21) Appl. No.: 16/898,747

(22) Filed: Jun. 11, 2020

(65) Prior Publication Data

US 2021/0201081 A1     Jul. 1, 2021

(30) Foreign Application Priority Data

Dec. 27, 2019    (CN) .......................... 201911378929.7

(51) Int. Cl.
*G06V 10/00*        (2022.01)
*G06K 9/62*          (2022.01)

(52) U.S. Cl.
CPC ........... *G06K 9/6259* (2013.01); *G06K 9/626* (2013.01); *G06K 9/6261* (2013.01)

(58) Field of Classification Search
CPC .... G06K 9/6259; G06K 9/6261; G06K 9/626; G06K 9/6269; G06K 9/628; G06K 9/6298; G06K 9/6256; G06N 3/0454; G06N 3/08

See application file for complete search history.

(56) References Cited

U.S. PATENT DOCUMENTS

| 4,907,229 | A  | * | 3/1990  | Edwards | G06F 11/25 |
|           |    |   |         |         | 714/E11.155 |
| 9,135,572 | B2 | * | 9/2015  | Bjork   | G06K 9/6256 |
| 9,852,231 | B1 | * | 12/2017 | Ravi    | G06F 16/9024 |
| 10,679,150| B1 | * | 6/2020  | Larson  | G06N 5/04 |

(Continued)

FOREIGN PATENT DOCUMENTS

CN       108875775 A       11/2018

OTHER PUBLICATIONS

Anonymous: "Tutorial: How to label thousands of images using the crowd; Amazon Mechanical Turk; Happenings at MTurk", Amazon Mechanical Turk, May 22, 2017, 12 pages, P055717780, Retrieved from the Internet: URL: https://blog, mturk.com/tutorial-how-to-label-thousands-of-images-using-the-crowd-bea164ccbefc [retrieved Jul. 23, 2020].

(Continued)

*Primary Examiner* — Amir Alavi
(74) *Attorney, Agent, or Firm* — Quarles & Brady LLP; James J. Aquilina

(57) ABSTRACT

A data labeling method, apparatus and system are provided. The method includes: sampling a data source according to an evaluation task for the data source to obtain sampled data; generating a labeling task from the sampled data; sending the labeling task to a labeling device; and receiving a labeled result of the labeling task from the labeling device. As such, an automatic evaluation of data can be implemented by using the evaluation task, and evaluation efficiency is improved.

25 Claims, 10 Drawing Sheets

(56) References Cited

U.S. PATENT DOCUMENTS

| | | | |
|---|---|---|---|
| 10,810,317 B2* | 10/2020 | Williamson | G06F 21/6254 |
| 11,270,159 B1* | 3/2022 | Gao | H04N 21/251 |
| 2016/0078359 A1* | 3/2016 | Csurka | G06K 9/6215 |
| | | | 706/12 |
| 2017/0308709 A1* | 10/2017 | Ching | G06F 21/602 |
| 2018/0211303 A1* | 7/2018 | Chatwin | G06N 20/00 |
| 2021/0201081 A1* | 7/2021 | Wang | G06K 9/6259 |
| 2021/0390355 A1* | 12/2021 | Xu | G06N 3/0454 |

OTHER PUBLICATIONS

European Patent Office Search Report of Application No. 20180600.7-1213 , dated Oct. 1, 2020, 4 pages.

* cited by examiner

DATA LABELING METHOD, APPARATUS AND SYSTEM

CROSS-REFERENCE TO RELATED APPLICATIONS

This application claims priority to Chinese patent application No. 201911378929.7, filed on Dec. 27, 2019, which is hereby incorporated by reference in its entirety.

TECHNICAL FIELD

The present disclosure relates to a field of data processing, and in particular, to a field of knowledge graph and data labeling.

BACKGROUND

At present, in the methods for measuring data capability and data quality of a Knowledge Graph (KG), it is mainly used a series of data evaluation indexes to reflect such data capability and data quality. Subject-Predicate-Object (SPO) attribute accuracy rate is taken as an example. The accuracy of a piece of data can be determined by evaluating the SPO in the data. For example, if S in a piece of data is "Yandang Mountain", P is "totally covers", and O is "450 km$^2$", then the SPO for this data is accurate. As another example, if S in a piece of data is "A certain company", P is "is established on", and O is "a certain day, a certain month, and a certain year", then the SPO for this data is inaccurate because the date is incorrect.

At present, indexes used to evaluate knowledge graph data include accuracy rate, repetition rate, low quality rate and the like. As the knowledge graph that is constructed with data becomes more and more complex, a more accurate evaluation of data indexes is needed. However, there are currently many problems with the standard iterative stability and the analysis of the data results of the overall data indexes. For example, processes are decentralized and management costs are high; manual evaluation standards are inconsistent; efficiency of manual evaluation is low; data is processed repetitively and overall time-consuming is long.

SUMMARY

In an embodiment of the application, a data labeling method is provided, the method comprises:
sampling a data source according to an evaluation task for the data source, to obtain sampled data;
generating a labeling task from the sampled data;
sending the labeling task to a labeling device; and
receiving a labeled result of the labeling task from the labeling device.

In the embodiment of the present application, an automatic evaluation of data can be implemented by using the evaluation task, so that evaluation efficiency is improved. By using the evaluation task to sample the data source, the amount of data to be processed can be reduced. And since the sampled data is random, accurate labeled results can be obtained.

In an implementation, the method further comprises:
recording the labeled result of the labeling task into the evaluation task.

In an implementation, the method further comprises:
generating the evaluation task for the data source, wherein the evaluation task comprises an evaluation index, and the evaluation index has a corresponding sampling rule.

In an implementation, the method further comprises:
receiving an inspection result and address information of a first data source which has passed a first inspection; and
performing a second inspection on the first data source to use the first data source which has passed the second inspection as the data source; and generating the evaluation task for the data source.

In an implementation, wherein the sampling a data source according to an evaluation task for the data source to obtain sampled data comprises:
sampling the data source according to the evaluation task for the data source and the address information of the data source to obtain the sampled data.

In an implementation, the method further comprises:
evaluating the received labeled result to obtain an evaluation result for each labeled result;
sending the evaluation result for the labeled result to a server; and
receiving an analysis result from the server, wherein the analysis result comprises labeled results of labeling tasks belonging to the same evaluation task and/or evaluation results for labeled results of labeling tasks belonging to the same evaluation task.

It is helpful to summarize the overall qualities of the labels to analyze the labeled results and/or evaluation results via the server.

In an implementation, wherein the sending the labeling task to a labeling device comprises: sending the labeling task to the labeling device via a server; and
wherein the receiving a labeled result of the labeling task from the labeling device comprises: receiving the labeled result of the labeling task from the labeling device via the server.

It is helpful to facilitate the uniform management and rational distribution of the labeling task and the labeled result to transmit the labeling tasks and labeled results via the server.

In an embodiment of the present application, a data labeling apparatus is provided, the apparatus comprises:
a sampling module, configured to sample a data source according to an evaluation task for the data source to obtain sampled data;
a first generating module, configured to generate a labeling task from the sampled data;
a first sending module, configured to send the labeling task to a labeling device; and
a first receiving module, configured to receive a labeled result of the labeling task from the labeling device.

In an implementation, the apparatus further comprises:
a recording module, configured to record the labeled result of the labeling task into the evaluation task.

In an implementation, the apparatus further comprises:
a second generating module, configured to generate an evaluation task for the data source, wherein the evaluation task includes an evaluation index, and the evaluation index has a corresponding sampling rule.

In an implementation, the apparatus further comprises:
a second receiving module, configured to receive an inspection result and address information of a first data source which has passed a first inspection; and
a third generating module, configured to perform a second inspection on the first data source to use the first data source which has passed the second inspection as the data source; and generating the evaluation task for the data source.

In an implementation, wherein the sampling module is further configured to sample the data source according to the evaluation task for the data source and the address information of the data source, to obtain the sampled data.

In an implementation, the apparatus further comprises:

an evaluating module, configured to evaluate the received labeled result to obtain an evaluation result for the labeled result;

a second sending module, configured to send the evaluation result for the labeled result to a server;

a third receiving module, configured to receive an analysis result from the server, wherein the analysis result comprises labeled results of labeling tasks belonging to the same evaluation task and/or evaluation results for labeled results of labeling tasks belonging to the same evaluation task.

In an implementation, the first sending module is further configured to send the labeling task to the labeling device via a server;

the first receiving module is further configured to receive the labeled result of the labeling task from the labeling device via the server.

In an embodiment of the present application, a data labeling system is provided, the system comprises:

a task device, configured to execute the data labeling method according to any one of embodiments;

at least one labeling device, configured to receive a labeling task from the task device, to label data included in the labeling task, and to send a labeled result of the labeling task to the task device.

In an implementation, the system further comprises:

a server, configured to receive an evaluation result for the labeled result from the task device; to analyze labeled results of labeling tasks belonging to the same evaluation task to obtain an analysis result, wherein the analysis result includes the labeled results of the labeling tasks belonging to the same evaluation task and/or evaluation results for the labeled results belonging to the same evaluation task; and to send the analysis result to the task device.

In an implementation, the labeling device is further configured to preload and cache a page of a plurality of pieces of data to be labeled.

The advantages or beneficial effects of an embodiment of the above application include: an automatic evaluation of data can be implemented by using the evaluation task, so that evaluation efficiency is improved. By using the evaluation task to sample the data source, the amount of data to be processed can be reduced. And since the sampled data is random, accurate labeled results can be obtained.

Other effects of the foregoing optional manners will be described below in conjunction with specific embodiments.

BRIEF DESCRIPTION OF THE DRAWINGS

The drawings are used to better understand the solution, and do not constitute a limitation on the application. among them.

DETAILED DESCRIPTION OF THE EMBODIMENTS

With reference to the accompanying drawings, exemplary embodiments of the present application are described below, which include various details of the embodiments of the present application to facilitate understanding and should be considered as merely exemplary. Therefore, those of ordinary skill in the art should recognize that various changes and modifications can be made to the embodiments described herein without departing from the scope and spirit of the application. Also, for clarity and conciseness, descriptions for public knowledge of functions and structures are omitted in the following descriptions.

Figure 1:
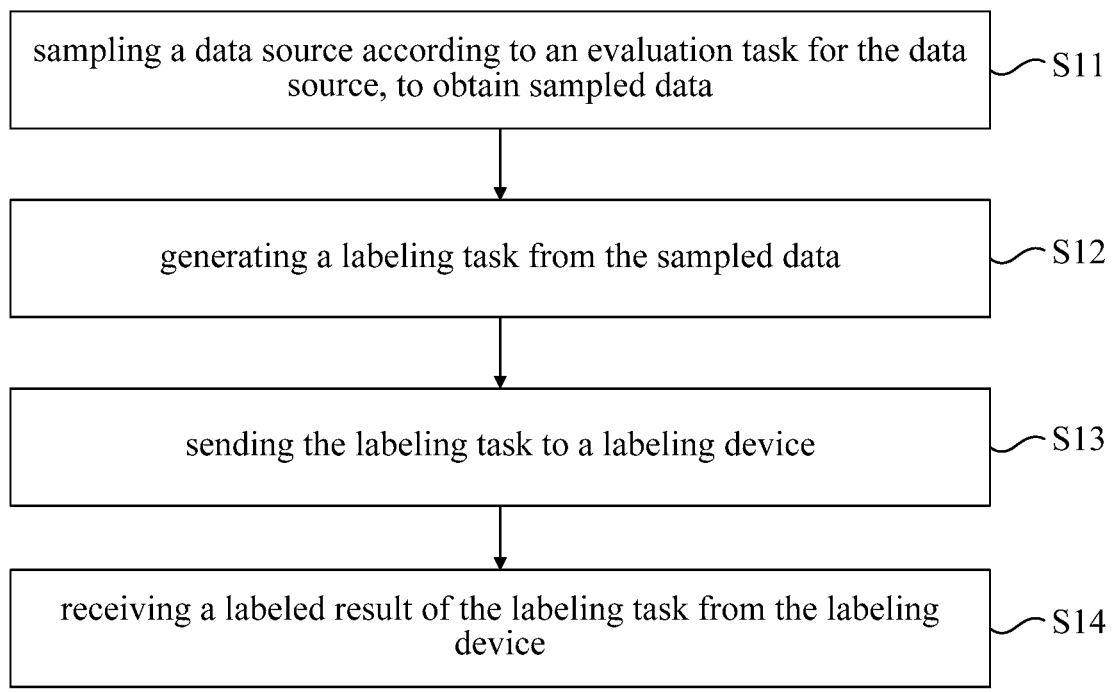
FIG. 1 is a flowchart of a data labeling method according to an embodiment of the present application.

FIG. 1 is a flowchart of a data labeling method according to an embodiment of the present application. As shown in FIG. 1, the method may include the following steps.

S11, sampling a data source according to an evaluation task for the data source to obtain sampled data.

In the embodiment of the present application, the data source may include a plurality of types, such as a data warehouse, a File Transfer Protocol (FTP) system or a Hadoop Distributed File System (HDFS). The data warehouse can include structured data, a knowledge graph, and the like. The FTP system or HDFS can include a data set such as a log and offline data and the like. A unified management can be performed on multiple data sources that need to be evaluated.

An evaluation task can be created for a data source that needs to be evaluated. The evaluation task may include various parameters required for an evaluation, such as accuracy rate, repetition rate, attributes to be evaluated, and the number of pieces of data to be evaluated. The data source can be sampled, at a task device such as a Product Manager/Project Manager (PM) device, according to the evaluation task to obtain the sampled data. For example, if the data source includes 10,000 pieces of data and 1,000 pieces of data thereof need to be evaluated, 1,000 pieces of sampled data shall be sampled from the data source.

In one embodiment, the step S11 includes: the data source is sampled according to the evaluation task for the data source and the address information of the data source, to obtain the sampled data.

Exemplarily, the address information of the data source can be included in the evaluation task, or it can be sent to the task device separately outside of the evaluation task. The task device can quickly and accurately find the data source according to the address information. And the sampled data can be obtained by sampling the data source.

S12, generating a labeling task from the sampled data.

In an embodiment of the present application, a plurality of labeling tasks can be generated from the sampled data. The number of pieces of sampling data included in each labeling task may be the same or different. For example, 5 labeling tasks are generated from 1,000 pieces of sample data, one labeling task for every 200 pieces of data. As another example, 3 labeling tasks are generated from 1,000 pieces of sample data, and the 3 labeling tasks respectively include 300, 330, and 370 pieces of data.

S13, sending the labeling task to a labeling device.

In an embodiment of the present application, there may be a plurality of labeling devices. The working status of each of the labeling devices can be used as a basis for deciding the labeling task to be sent to each labeling device. Alternatively, the working status of each of the labeling devices can be pre-referred during the process of generating labeling tasks. It is beneficial to increase the labeling speed if the plurality of labeling devices are sent different labeling tasks, respectively. For example, 3 generated labeling tasks are respectively sent to 3 labeling devices. As another example, 10 generated labeling tasks are respectively sent to 5 labeling devices, each labeling device two labeling tasks.

In one embodiment, the step S13 includes: sending the labeling task to the labeling device via a server. For example, the task device sends each labeling task to the server, and the server evaluates the task status of each labeling device and makes a decision about to send each labeling task to which labeling device.

S14, receiving a labeled result of the labeling task from the labeling device.

In the embodiment of the present application, after receiving the labeling task, the labeling device may label various pieces of data in the labeling task. The labeling method can be different for different evaluation parameter such as repetition rate and accuracy rate and the like. Data to be labeled and a labeling page of the data can be displayed at the labeling device. A marker can operate on the labeling page and record the labeled result of each piece of data in the labeling task. The labeled result includes, but is not limited to, a text, an image, a video, and other things that are associated with the evaluation parameter. For example, it need to be labeled with information about whether the data A is accurate, a position of the labeling page where the data A is recorded to be inaccurate, and a retrieved screenshot with an accurate interpretation to the data A needed. The labeled result can further include information about the labeling device and the marker, the labeling time and the like.

In one embodiment, the step S14 includes the step of receiving the labeled result of the labeling task from the labeling device via the server. For example, the labeling device sends the labeled result of a labeling task to the server first, and then the server sends the labeled result to the task device that initiates the labeling task. It is helpful to facilitate the uniform management and rational distribution of the labeling task and the labeled result to transmit the labeling tasks and labeled results via the server.

In an embodiment of the present application, an automatic evaluation of data can be implemented by using the evaluation task. As compared with manual evaluation, such automatic evaluation is helpful to improve the evaluation efficiency and reduce the evaluation time. By using the evaluation task to sample the sample data source, the amount of data to be processed can be reduced. And since the sampled data is random, accurate labeled results can be obtained. Further, since a unified management can be performed on the data source and data label evaluation process, the processes are centralized and the management costs are reduced. In addition, the parameters to be labeled can be configured uniformly through the evaluation task to unify evaluation standards.

Figure 2:
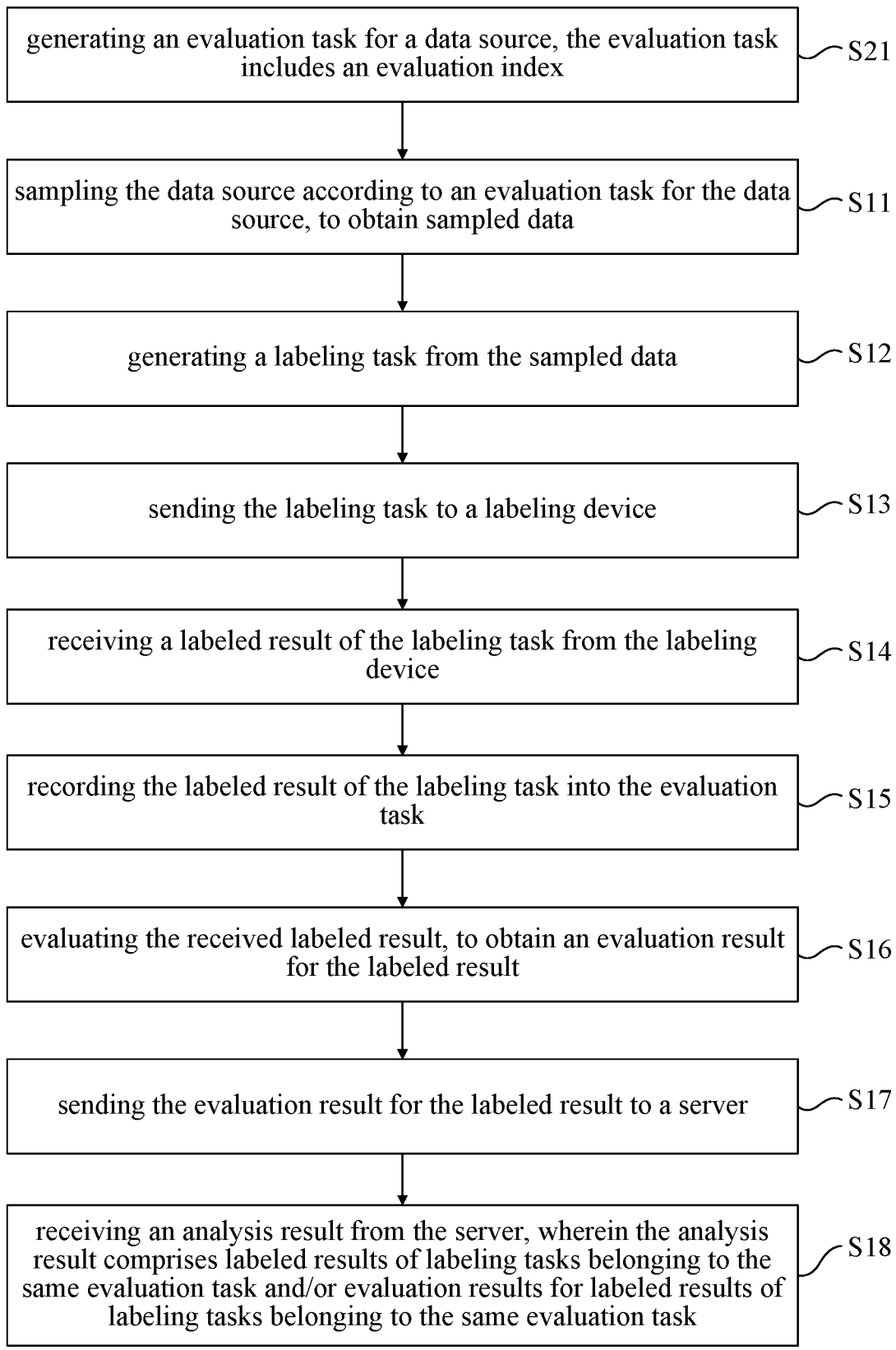
FIG. 2 is a flowchart of a data labeling method according to an embodiment of the present application.

In an embodiment, as shown in FIG. 2, the method may further include the following steps:

S15, recording the labeled result of the labeling task into the evaluation task.

The received labeled result of each labeling task can be recorded in the evaluation task that generates these labeling tasks for subsequent unified viewing and management.

In an embodiment, the method further includes:

S21, generating the evaluation task for the data source, wherein the evaluation task includes an evaluation index.

Exemplarily, the evaluation task includes various parameters required for the evaluation, such as accuracy rate, repetition rate, which attributes to be evaluated, how many pieces of data to be evaluated, and the like. Those parameters can also be referred to as evaluation index. For different evaluation indexes, the sampling rules to be used, such as a reservoir method, a cluster method, can be preset. When performing an evaluation task, the preset sampling rule can be automatically called according to the evaluation index in the evaluation task so as to initiate the sampling.

Figure 3:
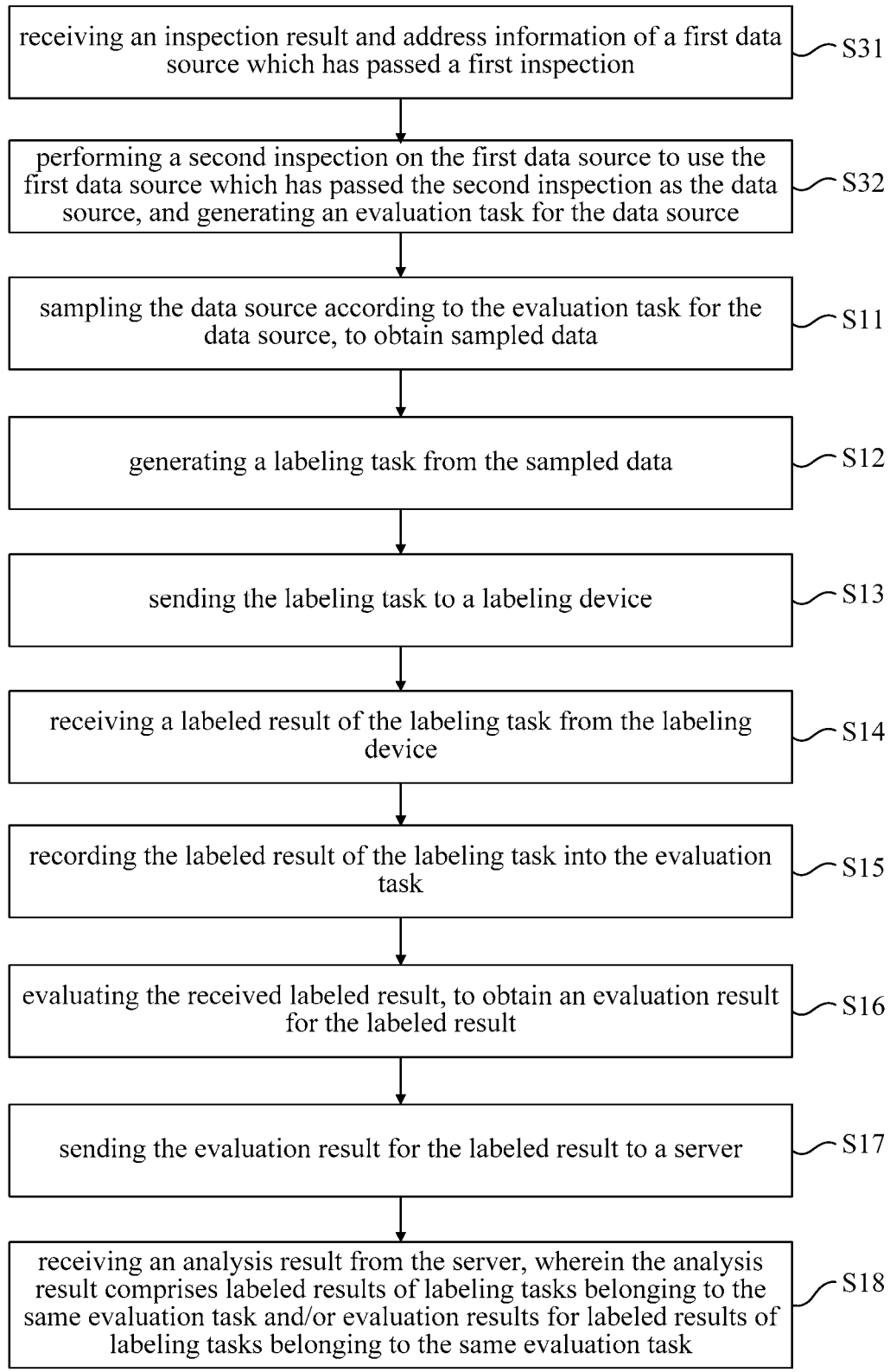
FIG. 3 is a flowchart of a data labeling method according to an embodiment of the present application.

In an embodiment, as shown in FIG. 3, the method further includes the following steps:

S31, receiving an inspection result and the address information of a first data source which has passed a first inspection.

S32, performing a second inspection on the first data source to use the first data source which has passed the second inspection as the data source, and generating an evaluation task for the data source.

Before the evaluation task is generated, a first inspection can be performed on the data source in advance by an inspector, such as a Research and Development (RD) personnel. The first inspection includes, but is not limited to, inspections of obvious typographical errors, formatting errors and the like in the data. The first inspection can be performed offline or online.

For example, the RD personnel extracts a small amount of data from a data source offline. After it is inspected to be accurate, the result of the first inspection is communicated to a PM personnel. The PM personnel performs a second inspection on the data source at the task device based on the result of the first inspection. If the result of the second inspection is accurate, it can be determined that the second inspection is passed.

As another example, the RD personnel extracts a small amount of data from a data source at the inspection device. After it is inspected to be accurate, the result of the first inspection is sent to the task device by the server. A PM personnel performs a second inspection on the data source at the task device based on the result of the first inspection. If the result of the second inspection is accurate, it can be determined that the second inspection is passed.

Unqualified data can be filtered out through multiple inspections, such that unnecessary data labeling processes are reduced.

In an embodiment, as shown in FIG. 2 and FIG. 3, the method further includes the following steps:

S16, evaluating the received labeled result to obtain an evaluation result for the labeled result.

S17, sending the evaluation result for the labeled result to a server.

S18, receiving an analysis result from the server, wherein the analysis result comprises labeled results of labeling tasks belonging to the same evaluation task and/or evaluation results for labeling results of labeling tasks belong to the same evaluation task.

The evaluation result may include the acceptance or modification of the evaluation result. It is helpful to summarize the overall qualities of the labels to analyze the labeled results and/or evaluation results via the server. For example, if there are 10,000 pieces of sampled data and 9,000 of them are accurate data, it can be concluded by analysis that the accuracy rate of the data source is 90%. The accuracy rate of the data source that is obtained through this evaluation can be displayed at the task device.

In the embodiment of the present application, after the task device has received the labeled results from the labeling device via the server, the task device may evaluate each labeled result. For example, the PM personnel can see the labeled result of each of the labeling tasks divided by each evaluation task at the labeling device. Then, the PM personnel can check whether these labeled results are accurate or reasonable. It is possible to give an evaluation result for each labeled result. If the labeled results are accurate, the PM personnel can submit the evaluation result of each of the labeled results to the server at the labeling device. If a labeled result is inaccurate or unreasonable, the PM personnel can also return the labeled result to the labeling device for re-labelling.

Figure 4:
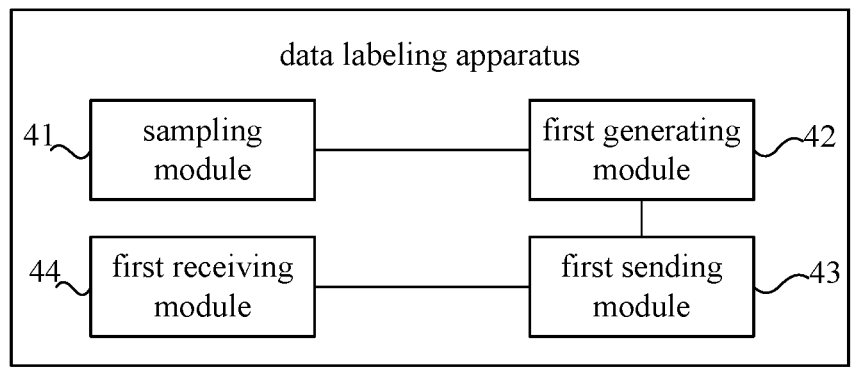
FIG. 4 is a block diagram of a data labeling apparatus according to an embodiment of the present application.

FIG. 4 is a block diagram of a data labeling apparatus according to an embodiment of the present application. The apparatus may include:

a sampling module 41, configured to sample a data source according to an evaluation task for the data source to obtain sampled data;

a first generating module 42, configured to generate a labeling task from the sampled data;

a first sending module 43, configured to send the labeling task to a labeling device; and a first receiving module 44, configured to receive a labeled result of the labeling task from the labeling device.

Figure 5:
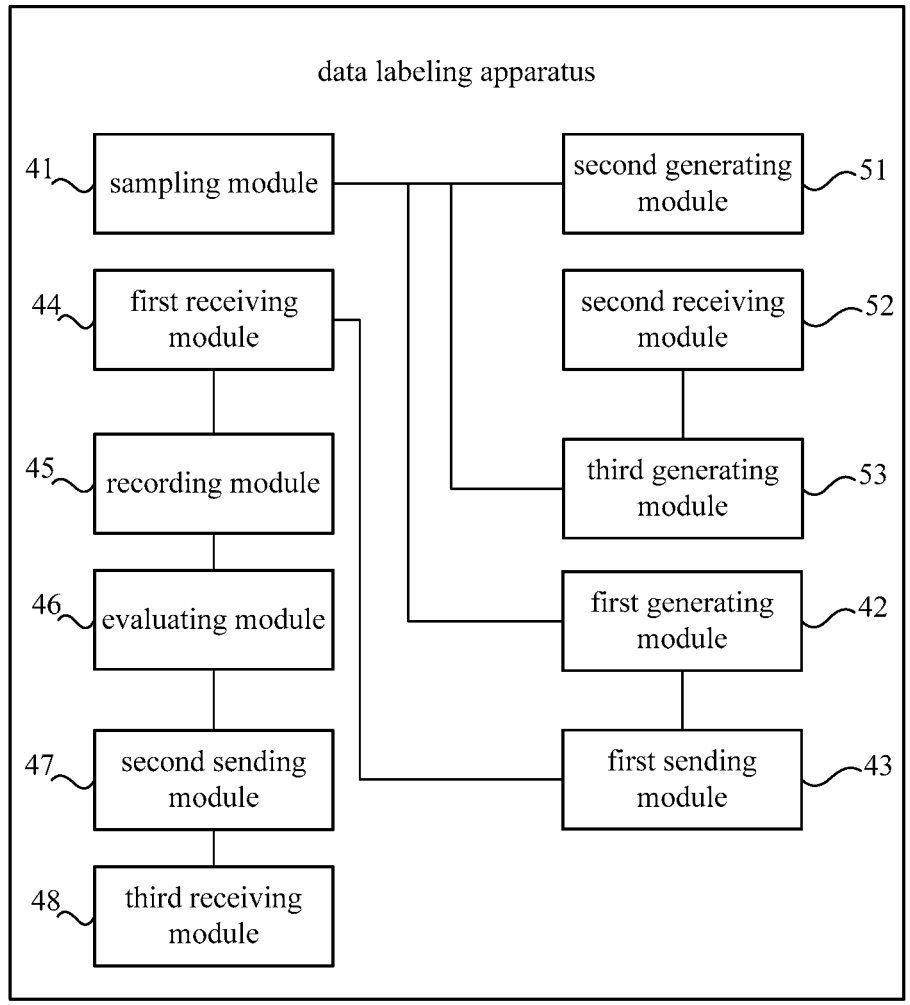
FIG. 5 is a block diagram of a data labeling apparatus according to an embodiment of the present application.

In an implementation, as shown in FIG. 5, the apparatus further includes:

a recording module 45, configured to record the labeled result of the labeling task into the evaluation task.

In an implementation, the apparatus further includes:

a second generating module 51, configured to generate an evaluation task for the data source, wherein the evaluation task includes an evaluation index.

In an implementation, the apparatus further includes:

a second receiving module 52, configured to receive an inspection result and address information of a first data source which has passed a first inspection; and a third generating module 53, configured to perform a second inspection on the first data source to use the first data source which has passed the second inspection as the data source, and generate an evaluation task for the data source.

In an implementation, the sampling module 41 is configured to:

sample the data source according to the evaluation task for the data source and the address information of the data source, to obtain the sampled data.

In an implementation, the apparatus further includes:

an evaluating module 46, configured to evaluate the received labeled result to obtain an evaluation result for each labeled result;

a second sending module 47, configured to send the evaluation result for the labeled result to a server;

a third receiving module 48, configured to receive an analysis result from the server, wherein the analysis result comprises labeled results of labeling tasks belonging to the same evaluation task and/or evaluation results for labeling tasks belonging to the same evaluation task.

In an implementation, the first sending module 43 is configured to send the labeling task to the labeling device via a server;

the first receiving module 44 is configured to receive the labeled result of the labeling task from the labeling device via the server.

In this embodiment of the present application, the functions of the modules in each device refer to the corresponding description of the above mentioned method and thus the description thereof is omitted herein.

Figure 6:
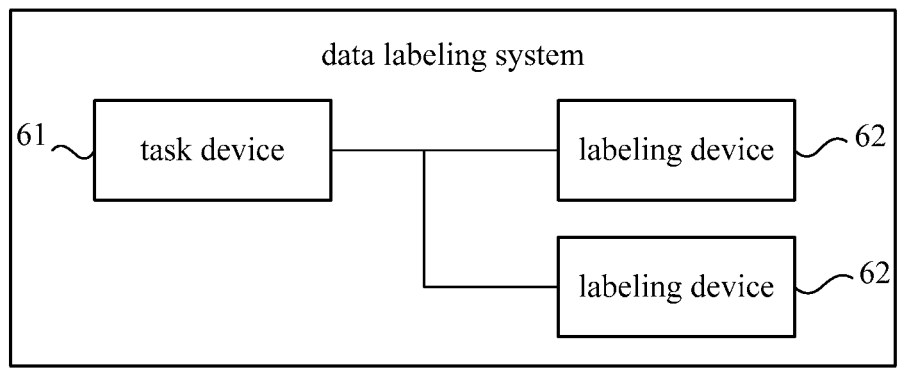
FIG. 6 is a block diagram of a data labeling system according to an embodiment of the present application.

FIG. 6 is a block diagram of a data labeling system according to an embodiment of the present application. The data labeling system may include:

a task device 61, configured to execute the data labeling method according to any one of embodiments;

at least one labeling device 62, configured to receive a labeling task from the task device, to label data included in the labeling task, and to send a labeled result of the labeling task to the task device.

Figure 7:
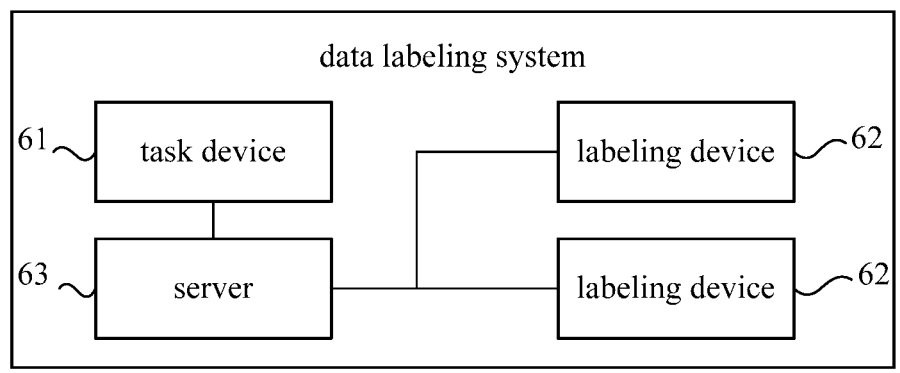
FIG. 7 is a block diagram of a data labeling system according to an embodiment of the present application.

In an implementation, as shown in FIG. 7, the system further includes:

a server 63, configured to receive an evaluation result for each labeled result from the task device; to analyze labeled results of labeling tasks belonging to the same evaluation task to obtain an analysis result, wherein the analysis result includes the labeled results of the labeling tasks belonging to the same evaluation task and/or evaluation results for the labeled results belonging to the same evaluation task; and to send the analysis result to the task device; and to send the analysis result to the task device.

In an implementation, the labeling device 62 is further configured to preload and cache pages of a plurality of pieces of data to be labeled. The page of the first piece of data can be shown on the labeling interface first. After the first piece of data has been labeled, the labeling interface switches to the page of the second piece of data and preload the pages of the subsequent pieces of data. In addition, a page can be reloaded and the top cached page(s) can be deleted, so as to reduce the impact of the page caching on the performance of the device.

In an implementation, the system may further include an inspection device, which is configured to perform a first inspection on a first data source, and to send the inspection result of the first inspection and the address information of the first data source which has passed the first inspection to the task device. The task device performs a second inspection on the first data source based on the result of the first inspection. After the first data source passes the second inspection, the first data source can be used as the data source for evaluation and an evaluation task of the data source is generated.

In the system of the embodiment of the present application, the functions of each component may refer to corresponding descriptions in the foregoing method, and thus the description thereof is omitted herein.

In an application example, a quality evaluation platform may include the following parts: data source management, evaluation item management, data sampling, labeling task, statistical report, and so on. The quality evaluation platform can evaluate the labels on data. The functions of each part are introduced below.

1. Data Source Management:

When performing data source management, a unified management can be performed on various currently evaluated data sources, such that repeated delivery of data can be avoided, data redundancy can be reduced, and overall process efficiency can be improved.

Platform users such as a RD personnel or PM personnel can import various data sources to the platform for unified management at his client. Data source type includes, but are not limited to, various types of data warehouses (such as HBASE) and offline data (such as FTP systems or HDFS) and so on. The data warehouse can include structured data, a knowledge graph, and so on, and the FTP system or HDFS can include a data set such as a log and offline data and the like.

Figure 8:
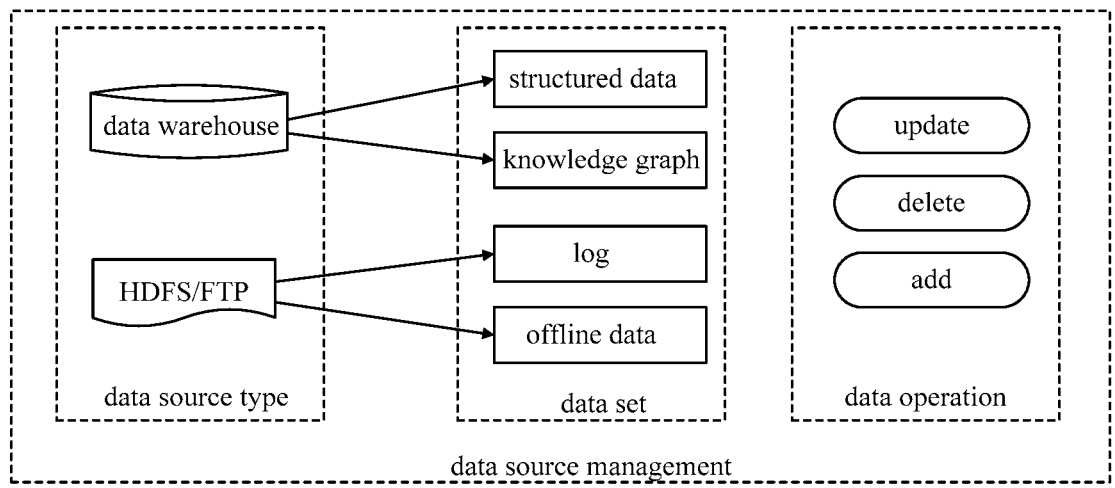
FIG. 8 is a schematic diagram of data source management according to an embodiment of the present application.

In the process of data source management, the data source or the data thereof can be deleted, added, and updated and so on, so that distributed data can be effectively managed, as shown in FIG. 8.

For example, when creating a data source, information like the identification (ID) of the data source, the name of the data source, the person in charge, the data type, the address of the data source, the status, the updated time, the description, the operation permission and the like can be recorded. In addition, multiple data sources can be managed through a data source list.

Figure 9:
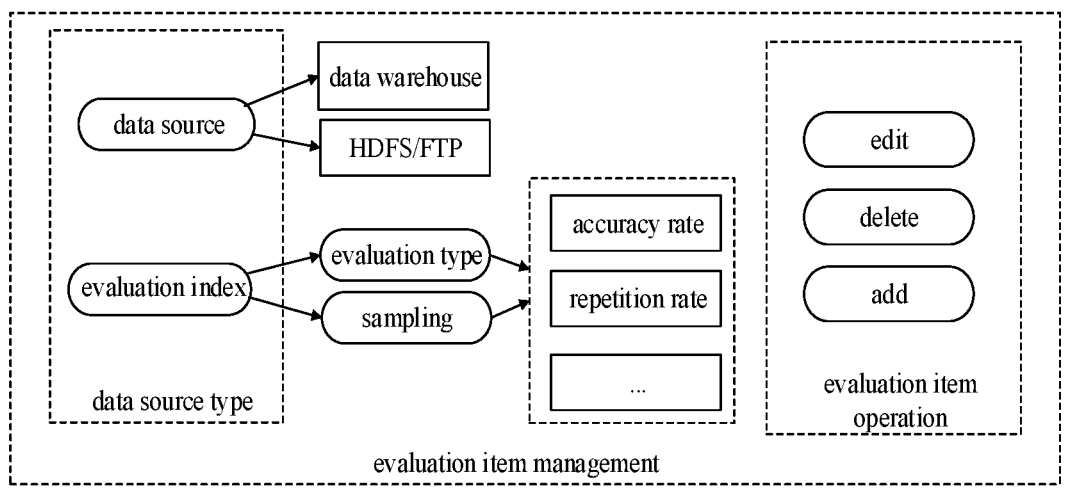
FIG. 9 is a schematic diagram of evaluation item management according to an embodiment of the present application.

2. Evaluation Item Management:

For the selected data source, the PM personnel selects an index to be evaluated at the task device, and configures the related sampling method and evaluation type. As shown in FIG. 9, the evaluation index may include accuracy rate, repetition rate, and other types. When performing evaluation item management, the operations like editing, deleting and adding can be performed on the evaluation items.

Examples of functions of evaluation item management are as follows:

1.) Creating a new evaluation item. For example, when configuring an evaluation item, the name of the evaluation item, the person in charge, the demander(s), and etc. can be determined, the data source to be evaluated, the scenario, the marker, and etc. can be selected, and the evaluation index (es) required by the data can be confirmed. Furthermore, a routine cycle of the evaluation task can also be set, for example, data sampling can be automatically performed every month/week, and an evaluation task can be initiated.

2.) Configuring an evaluation index. For example, when configuring an index item, the attribute and number of samples can be selected according to a specific index such as repetition rate, accuracy rate, low quality rate, recall rate, and the like as the basis for performing the sampling and evaluation. One data source can be configured with multiple evaluation indexes at the same time.

When creating the index item, the creation can be seemed to be completed if the information like a task type, task command, attribute, and number of samples have been filled or selected. For example, if the task type has been selected as "evaluation sampling", the task command has been selected as "random SPO repetition rate", the attribute has been filled with "name", and the number of samples has been filled with "500", then the creation for this index is seemed to be completed.

Figure 10:
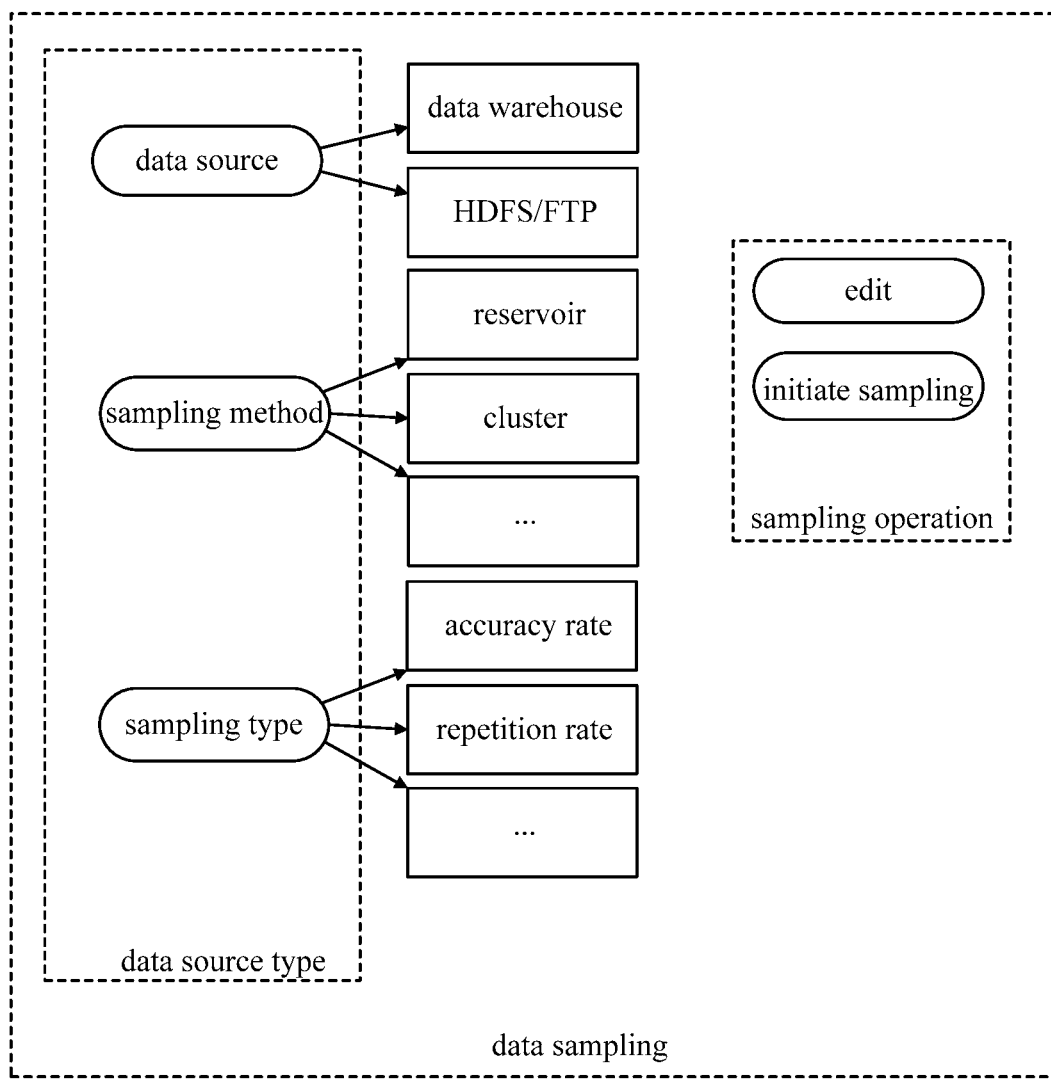
FIG. 10 is a schematic diagram of data sampling according to an embodiment of the present application.

3. Data sampling: As shown in FIG. 10, a sampling task can be initiated according to a sampling rule (or a sampling method), and sampled data can be output for labeling. The sampling rule includes, but are not limited to, a reservoir method, a cluster method or the like. The sampling rule can be predefined according to the data type and the data evaluation index. The sampling rule for different evaluation indexes may be the same or different. For example, different sampling types are set for accuracy rate and repetition rate, and each sampling type has a corresponding sampling method. When performing a data sampling, sampling operations, such as editing and initiating the sampling, can be performed.

4. Labeling Task Management:

A labeling task is generated based on an evaluation item configuration, and the status of the labeling task is recorded. Further, the ID of the labeling task, a data source, an evaluation item, a labeling index, a start time, an end time, an operation, and the like can also be recorded. After the evaluation task has been created, data sampling would be initiated. In addition, the labeling task is generated using the sampled data, and the labeling task is issued to the labeling device. Markers can see their labeling tasks at the labeling device.

5. Data Labeling:

After the labeling task of the data has been issued, the marker undertakes the task at the labeling device and starts to label the data. For example, a PM personnel can distribute the labeling tasks according to the amount of labeling tasks at the task device, and send a certain number of labeling tasks to each labeling device. The labeling device sends the label results to the task device. The PM personnel confirms the labeled results at the task device.

According to the methods for evaluating different evaluation indexes such as accuracy rate and repetition rate and the like, the template and style of an evaluation page can be different. In order to improve the labeling speed, the interaction on the evaluation page can be optimized. For example, automatic Uniform Resource Locator (URL) splicing, page preloading, and other manners can be used to improve the speed and efficiency of evaluation.

5.1 The URL can be automatically spliced according to the configuration to open an evaluation reference page.

For example, if the accuracy of a movie data "Movie T-Release Time-2019-11-01" need to be evaluated, a retrieved page for a marker can be automatically loaded according to the rules as shown in the table below, to save his time for repeated mechanized operation.

| S = Movie T | P = Release Time |
|---|---|
| Baidu | https://www.baidu.com/aaa={{S + P}} |
| Website1 | https://www.bbbbb.com/bbb=1002&q={{S}} |
| Website2 | https://cccc.com/ccc={{S}} |

Link addresses in the table above are only exemplary representations, and not specific to a specific web page.

5.2 Not only the reference page of the entity in the current evaluation can be loaded, but also the evaluation reference pages of the subsequent entities can be pre-loaded. In this way, the page loading speed can be greatly increased, the waiting time for page loading since switching to a next entity can be reduced, and the evaluation speed can be greatly increased.

When the labeling task is opened for the first time, the pages of the first 10 entities to be evaluated (page 1 to 10) are preloaded and cached, and the page of the first entity is displayed. When the first evaluation is completed and a second evaluation is switched to be displayed, the 11th entity evaluation page is preloaded, and so on, until the page of the 20th entity has been cached. Any subsequent loading of an entity evaluation page will cause a headmost cached page to be deleted, and the maximum number of cached pages shall not exceed 20, so as to reduce the impact of page caching on the performance of PC.

6. Statistical report: Statistics of the evaluation results is summarized and the report is displayed.

Figure 11:
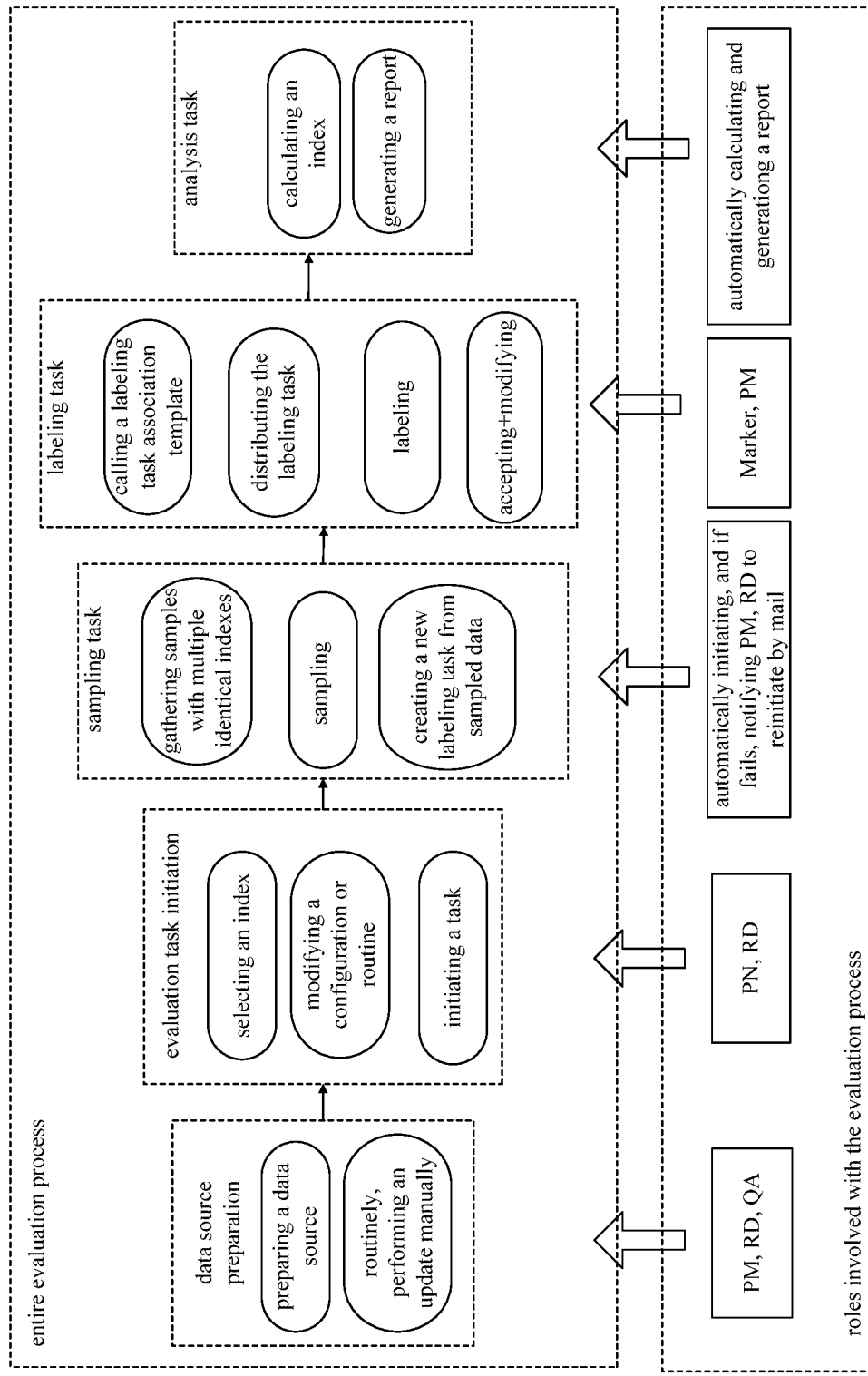
FIG. 11 is a schematic diagram of a quality evaluation process according to an embodiment of the present application.

FIG. 11 is an overall process of data evaluation using the quality evaluation platform of this example. The evaluation process can involve multiple roles. For example: PM, RD, Quality Assurance (QA) and marker.

Figure 12:
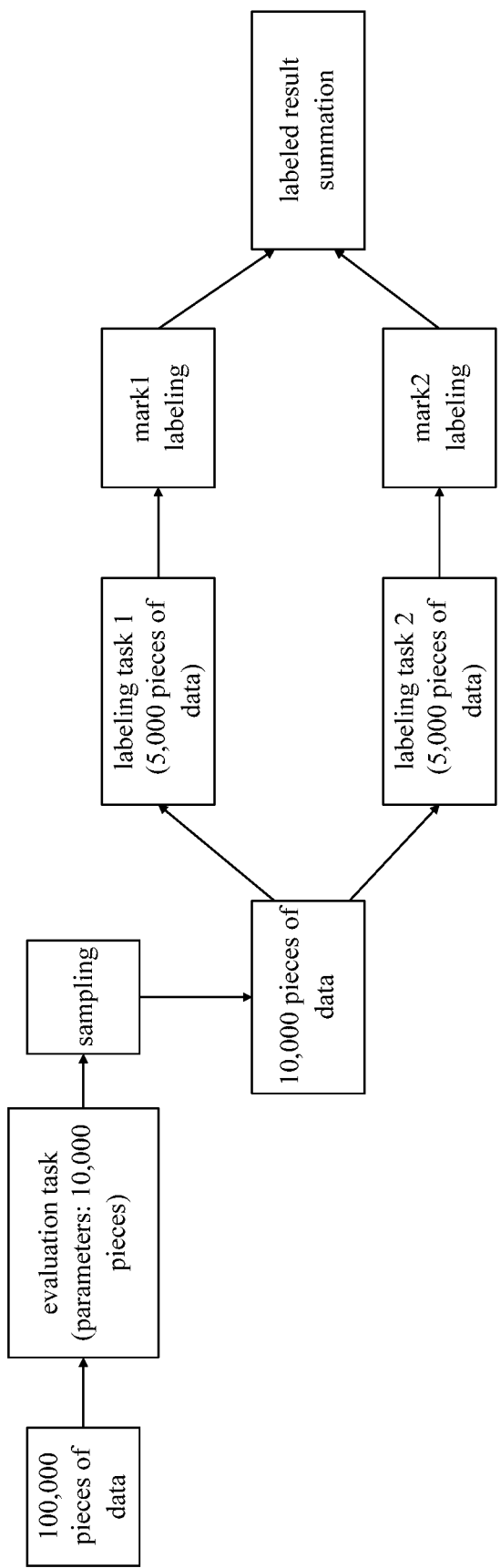
FIG. 12 is schematic diagram of a data sampling process according to an embodiment of the present application.

In a data source preparation stage, a RD personnel (through the inspection device) and a PM personnel (through the task device) can prepare a data source through a data source management function. For example, data of HBASE data warehouse is routinely sent out of the warehouse. HBASE files out of the warehouse are stored in the server of the platform for easy sampling. Before initiating a new evaluation task, it should be determined whether the data version/update time of the database is consistent. If they are not consistent, data of the HBASE data warehouse is sent out of the warehouse again. The QA personnel can supervise and manage the process of data source preparation. For example, as shown in FIG. 12, the RD personnel extracts 10 pieces of data from 100,000 pieces of data for inspection, and sends the inspection results to the task device. The PM personnel performs a secondary inspection of the inspection results at the task device. If this inspection is passed, the PM personnel initiates an evaluation task at the task device (for example, parameters in the evaluation task include: 10,000 pieces of data to be sampled).

During an evaluation task initiation stage, the PM personnel can select an index for the evaluation task, modify the configuration or routine, and initiate an evaluation task through the evaluation item management function. In this process, PM can refer to the inspection results and relevant suggestions from the RD. For example, as shown in FIG. 12, according to the parameter in the evaluation task, 10,000 pieces of data are sampled from 100,000 pieces of data.

In a sampling task stage, the evaluation task is performed. And the data source is sampled according to a certain sampling rule to obtain sampled data. And a new labeling task is created from the sampled data. Wherein, different indexes may be corresponding to a same sampling rule. At this stage, if the automatic initiation of the evaluation task fails, the related personnel such as the PM and the RD may be notified by email to reinitiate the evaluation task. For example, as shown in FIG. 12, the 10,000 pieces of sampled data are divided into two labeling tasks, and the labeling task 1 and labeling task 2 each include 5000 pieces of data.

During a labeling task stage, a labeling task association template can be called at the task device to distribute a labeling task to each labeling device. After a labeling task has been completed at a labeling device, it can be sent to the task device for accepting and modifying by the PM. After it has been accepted and modified, the labeling task can be submitted to the server. For example, as shown in FIG. 12, the labeling task 1 is assigned to the labeling device mark 1 for labeling, and the labeling task 2 is assigned to the labeling device mark 2 for labeling. Finally, the labeled results are summarized.

During an analysis task stage, the server can automatically calculate each index based on the labeled result and the evaluation result and generate a report. The server can return the generated report to the relevant task device. The PM personnel can see the report on the task device. The server can also send the generated report to the relevant inspection device. The RD personnel can see the report on the inspection device.

The data quality evaluation platform in this example of the application is used to manage the quality evaluation process for data like a knowledge graph. Through such a platform method, the evaluation process can be standardized, the threshold is decreased, and the cost for manual operation is reduced, so that evaluation efficiency is improved.

According to an embodiment of the present application, the present application further provides an electronic apparatus and a readable storage medium.

Figure 13:
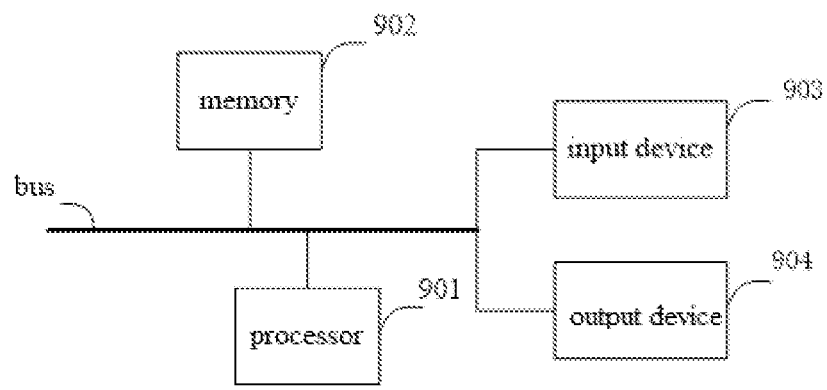
FIG. 13 is a block diagram of an electronic apparatus for performing a data labeling method according to an embodiment of the present application.

As shown in FIG. 13, it is a block diagram of an electronic apparatus according to the content placement method according to the embodiment of the present application. The electronic apparatus are intended to represent various forms of digital computers, such as laptop computers, desktop computers, workbenches, personal digital assistants, servers, blade servers, mainframe computers, and other suitable computers. Electronic apparatus may also represent various forms of mobile devices, such as personal digital processing, cellular phones, intelligent phones, wearable devices, and other similar computing devices. The components shown here, their connections and relationships, and their functions are merely examples, and are not intended to limit the implementation of the application described and/or required herein.

As shown in FIG. 13, the electronic apparatus includes: one or more processors 901, a memory 902, and interfaces for connecting various components, including a high-speed interface and a low-speed interface. The various components are interconnected using different buses and can be mounted on a common motherboard or otherwise installed as required. The processor may process instructions executed within the electronic apparatus, including storing in or on a memory to display a graphical user interface (GUI) on an external input/output device such as a display device coupled to the interface) Graphic information instructions. In other embodiments, multiple processors and/or multiple buses can be used with multiple memories and multiple memories, if desired. Similarly, multiple electronic apparatus can be connected, each providing some of the necessary operations (for example, as a server array, a group of blade servers, or a multiprocessor system). A processor 901 is taken as an example in FIG. 13.

The memory 902 is a non-transitory computer-readable storage medium provided by the present application. The memory stores instructions executable by at least one processor, so that the at least one processor executes the content placement method provided in the present application. The non-transitory computer-readable storage medium of the present application stores computer instructions, which are used to cause a computer to execute the content placement method provided by the present application.

As a non-transitory computer-readable storage medium, the memory 902 can be used to store non-transitory software programs, non-transitory computer executable programs, and modules, such as program instructions corresponding to the content placement method in the embodiments of the present application. Module/unit (for example, the sampling module 41, the first generating module 42, the first sending module 43, the first receiving module 44 shown in FIG. 4). The processor 901 executes various functional applications and data processing of the server by running non-transitory software programs, instructions, and modules stored in the memory 902, that is, the content placement method in the embodiments of the foregoing method can be implemented.

The memory 902 may include a storage program area and a storage data area, where the storage program area may store an operating system and an application program required for at least one function; the storage data area may store data created according to the use of the electronic device of the content placement method, etc. In addition, the memory 902 may include a high-speed random access memory, and may also include a non-transitory memory, such as at least one magnetic disk storage device, a flash memory device, or other non-transitory solid-state storage device. In some embodiments, the memory 902 may optionally include a memory remotely set relative to the processor 901, and these remote memories may be connected to the electronic apparatus with the content placement method through a network. Examples of the above network include, but are not limited to, the Internet, an intranet, a local area network, a mobile communication network, and combinations thereof.

The electronic apparatus with the content placement method may further include an input device 903 and an output device 904. The processor 901, the memory 902, the input device 903, and the output device 904 may be connected through a bus or in other manners. In FIG. 13, the connection through the bus is taken as an example.

The input device 903 can receive inputted numeric or character information, and generate key signal inputs related to user settings and function control of an electronic apparatus for content placement method, such as a touch screen, a keypad, a mouse, a trackpad, a touchpad, a pointing stick, one or more mouse buttons, a trackball, a joystick and other input devices. The output device 904 may include a display device, an auxiliary lighting device (for example, an LED), a haptic feedback device (for example, a vibration motor), and the like. The display device may include, but is not limited to, a liquid crystal display (Liquid Crystal Display, LCD), a light emitting diode (Light Emitting Diode, LED) display, and a plasma display. In some embodiments, the display device may be a touch screen.

Various implementations of the systems and technologies described herein can be implemented in digital electronic circuit systems, integrated circuit systems, application specific integrated circuits (ASICs), a computer hardware, a firmware, a software, and/or combinations thereof. These various embodiments may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, software, software applications, or code) include machine instructions of a programmable processor and can be implemented using high-level procedural and/or object-oriented programming languages, and/or assembly/machine languages. As used herein, the terms "machine-readable medium" and "computer-readable medium" refer to any computer program product, device, and/or device used to provide machine instructions and/or data to a programmable processor (for example, magnetic disks, optical disks, memories, and programmable logic devices (PLD)), include machine-readable media that receives machine instructions as machine-readable signals. The term "machine-readable signal" refers to any signal used to provide machine instructions and/or data to a programmable processor.

In order to provide interaction with the user, the systems and techniques described herein may be implemented on a computer having a display device (for example, a CRT (Cathode Ray Tube) or LCD (liquid crystal display) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The systems and technologies described herein can be implemented in a subscriber computer of a computing system including background components (for example, as a data server), a computing system including middleware components (for example, an application server), or a computing system including front-end components (for example, a user computer with a graphical user interface or a web browser, through which the user can interact with the implementation of the systems and technologies described herein), or a computer system including such background components, middleware components, or any combination of front-end components. The components of the system may be interconnected by any form or medium of digital data communication (such as, a communication network). Examples of communication networks include: a local area network (LAN), a wide area network (WAN), and the Internet.

Computer systems can include clients and servers. The client and server are generally remote from each other and typically interact through a communication network. The client-server relationship is generated by computer programs running on the respective computers and having a client-server relationship with each other.

According to the technical solution of the embodiment of the present application, by using the evaluation task, an automatic evaluation of data can be implemented, and the evaluation efficiency is improved. By using the evaluation task to sample the data source, the amount of data to be processed can be reduced. And since the sampled data is random, accurate labeled results can be obtained.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementation manners do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A data labeling method, comprising:
    sampling a data source according to an evaluation task for the data source, to obtain sampled data;
    generating a labeling task from the sampled data;
    sending the labeling task to a labeling device; and
    receiving a labeled result of the labeling task from the labeling device, wherein the method further comprises:
generating the evaluation task for the data source, wherein the evaluation task comprises an evaluation index, and the evaluation index has a corresponding sampling rule.

2. The method according to claim 1, further comprising:
recording the labeled result of the labeling task into the evaluation task.

3. The method according to claim 1, further comprising:
evaluating the received labeled result to obtain an evaluation result for the labeled result;
sending the evaluation result for the labeled result to a server; and
receiving an analysis result from the server, wherein the analysis result comprises labeled results of labeling tasks belonging to the same evaluation task and/or evaluation results for labeled results of labeling tasks belonging to the same evaluation task.

4. The method according to claim 1, wherein the sending the labeling task to a labeling device comprises:
sending the labeling task to the labeling device via a server; and
wherein the receiving a labeled result of the labeling task from the labeling device comprises:
receiving the labeled result of the labeling task from the labeling device via the server.

5. A data labeling system, comprising:
a task device, configured to execute the data labeling method of claim 1;
at least one labeling device, configured to receive a labeling task from the task device, to label data included in the labeling task, and to send a labeled result of the labeling task to the task device.

6. The system according to claim 5, further comprising:
a server, configured to receive an evaluation result for the labeled result from the task device; to analyze labeled results of labeling tasks belonging to the same evaluation task to obtain an analysis result, wherein the analysis result includes the labeled results of the labeling tasks belonging to the same evaluation task and/or evaluation results for the labeled results belonging to the same evaluation task; and to send the analysis result to the task device.

7. The system according to claim 5, wherein:
the labeling device is further configured to preload and cache pages of a plurality of pieces of data to be labeled.

8. A data labeling apparatus, comprising:
one or more processors; and
a storage device configured to store one or more programs, wherein
the one or more programs, when executed by the one or more processors, cause the one or more processors to:
sample a data source according to an evaluation task for the data source, to obtain sampled data;
generate a labeling task from the sampled data;
send the labeling task to a labeling device; and
receive a labeled result of the labeling task from the labeling device,
wherein the one or more programs, when executed by the one or more processors, cause the one or more processors further to:
generate an evaluation task for the data source, wherein the evaluation task comprises an evaluation index, and the evaluation index has a corresponding sampling rule.

9. The apparatus according to claim 8, wherein the one or more programs, when executed by the one or more processors, cause the one or more processors further to:
record the labeled result of the labeling task into the evaluation task.

10. The apparatus according to claim 8, wherein the one or more programs, when executed by the one or more processors, cause the one or more processors further to:
evaluate the received labeled result to obtain an evaluation result for the labeled result;
send the evaluation result for the labeled result to a server; and
receive an analysis result from the server, wherein the analysis result comprises labeled results of labeling tasks belonging to the same evaluation task and/or evaluation results for labeled results of labeling tasks belonging to the same evaluation task.

11. The apparatus according to claim 8, wherein the one or more programs, when executed by the one or more processors, cause the one or more processors further to:
send the labeling task to the labeling device via a server;
receive the labeled result of the labeling task from the labeling device via the server.

12. A non-transitory computer-readable storage medium, comprising computer executable instructions stored thereon, wherein the executable instructions, when executed by a computer, cause the computer to:
sample a data source according to an evaluation task for the data source, to obtain sampled data;
generate a labeling task from the sampled data;
send the labeling task to a labeling device; and
receive a labeled result of the labeling task from the labeling device,
wherein the executable instructions, when executed by a computer, further cause the computer to:
generate the evaluation task for the data source, wherein the evaluation task comprises an evaluation index, and the evaluation index has a corresponding sampling rule.

13. The non-transitory computer-readable storage medium according to claim 12, wherein the executable instructions, when executed by a computer, further cause the computer to:
record the labeled result of the labeling task into the evaluation task.

14. A data labeling method, comprising:
sampling a data source according to an evaluation task for the data source, to obtain sampled data;
generating a labeling task from the sampled data;
sending the labeling task to a labeling device; and
receiving a labeled result of the labeling task from the labeling device,
wherein the method further comprises:
receiving an inspection result and address information of a first data source which has passed a first inspection; and
performing a second inspection on the first data source to use the first data source which has passed the second inspection as the data source; and generating the evaluation task for the data source.

15. The method according to claim 14, further comprising:
recording the labeled result of the labeling task into the evaluation task.

16. The method according to claim 14, wherein the sampling a data source according to an evaluation task for the data source, to obtain sampled data comprises:
sampling the data source according to the evaluation task for the data source and the address information of the data source, to obtain the sampled data.

17. The method according to claim 14, further comprising:
- evaluating the received labeled result to obtain an evaluation result for the labeled result;
- sending the evaluation result for the labeled result to a server; and
- receiving an analysis result from the server, wherein the analysis result comprises labeled results of labeling tasks belonging to the same evaluation task and/or evaluation results for labeled results of labeling tasks belonging to the same evaluation task.

18. The method according to claim 14, wherein the sending the labeling task to a labeling device comprises:
- sending the labeling task to the labeling device via a server; and
- wherein the receiving a labeled result of the labeling task from the labeling device comprises:
- receiving the labeled result of the labeling task from the labeling device via the server.

19. A data labeling system, comprising:
- a task device, configured to execute the data labeling method of claim 14;
- at least one labeling device, configured to receive a labeling task from the task device, to label data included in the labeling task, and to send a labeled result of the labeling task to the task device.

20. A data labeling apparatus, comprising:
- one or more processors; and
- a storage device configured to store one or more programs, wherein
- the one or more programs, when executed by the one or more processors, cause the one or more processors to:
- sample a data source according to an evaluation task for the data source, to obtain sampled data;
- generate a labeling task from the sampled data;
- send the labeling task to a labeling device; and
- receive a labeled result of the labeling task from the labeling device,
- wherein the one or more programs, when executed by the one or more processors, cause the one or more processors further to:
- receive an inspection result and address information of a first data source which has passed a first inspection; and
- perform a second inspection on the first data source to use the first data source which has passed the second inspection as the data source, and generate the evaluation task for the data source.

21. The apparatus according to claim 20, wherein the one or more programs, when executed by the one or more processors, cause the one or more processors further to:
- record the labeled result of the labeling task into the evaluation task.

22. The apparatus according to claim 20, wherein the one or more programs, when executed by the one or more processors, cause the one or more processors further to:
- sample the data source according to the evaluation task for the data source and the address information of the data source, to obtain the sampled data.

23. The apparatus according to claim 20, wherein the one or more programs, when executed by the one or more processors, cause the one or more processors further to:
- evaluate the received labeled result to obtain an evaluation result for the labeled result;
- send the evaluation result for the labeled result to a server; and
- receive an analysis result from the server, wherein the analysis result comprises labeled results of labeling tasks belonging to the same evaluation task and/or evaluation results for labeled results of labeling tasks belonging to the same evaluation task.

24. The apparatus according to claim 20, wherein the one or more programs, when executed by the one or more processors, cause the one or more processors further to:
- send the labeling task to the labeling device via a server;
- receive the labeled result of the labeling task from the labeling device via the server.

25. A non-transitory computer-readable storage medium, comprising computer executable instructions stored thereon, wherein the executable instructions, when executed by a computer, cause the computer to:
- sample a data source according to an evaluation task for the data source, to obtain sampled data;
- generate a labeling task from the sampled data;
- send the labeling task to a labeling device; and
- receive a labeled result of the labeling task from the labeling device,
- wherein the executable instructions, when executed by a computer, further cause the computer to:
- receive an inspection result and address information of a first data source which has passed a first inspection; and
- perform a second inspection on the first data source to use the first data source which has passed the second inspection as the data source; and generate the evaluation task for the data source.

* * * * *